US012761091B2

(12) United States Patent
Chen et al.

(10) Patent No.: US 12,761,091 B2
(45) Date of Patent: Oct. 13, 2026

(54) PRESSURE-SENSITIVE INK, FLEXIBLE PRESSURE SENSING STRUCTURE, AND ELECTRONIC DEVICE

(71) Applicants: Avary Holding (Shenzhen) Co., Limited., Shenzhen (CN); QING DING PRECISION ELECTRONICS (HUAIAN) CO., LTD, Huai an (CN); GARUDA TECHNOLOGY CO., LTD., New Taipei (TW)

(72) Inventors: Kuan-Ying Chen, New Taipei (TW); Hsiao-Ting Hsu, New Taipei (TW); Fu-Yun Shen, Shenzhen (CN)

(73) Assignees: Avary Holding (Shenzhen) Co., Limited., Shenzhen (CN); QING DING PRECISION ELECTRONICS (HUAIAN) CO., LTD, Huai an (CN); GARUDA TECHNOLOGY CO., LTD., New Taipei (TW)

( * ) Notice: Subject to any disclaimer, the term of this patent is extended or adjusted under 35 U.S.C. 154(b) by 461 days.

(21) Appl. No.: 18/384,531

(22) Filed: Oct. 27, 2023

(65) Prior Publication Data

US 2025/0137856 A1 May 1, 2025

(51) Int. Cl.
*G01L 1/18* (2006.01)
*G01L 1/22* (2006.01)

(52) U.S. Cl.
CPC .............. *G01L 1/18* (2013.01); *G01L 1/2275* (2013.01); *G01L 1/2287* (2013.01)

(58) Field of Classification Search
CPC . G01L 1/20; G01L 1/18; G01L 1/2275; G01L 1/2287
See application file for complete search history.

(56) References Cited

U.S. PATENT DOCUMENTS

| | | | | |
|---|---|---|---|---|
| 6,642,297 | B1 * | 11/2003 | Hyatt | H01C 7/12 524/404 |
| 7,132,922 | B2 * | 11/2006 | Harris | H10W 42/80 338/21 |
| 10,908,037 | B2 * | 2/2021 | Li | G01L 1/18 |
| 2014/0260653 | A1 * | 9/2014 | Merrell | H10N 30/092 73/774 |
| 2018/0356303 | A1 * | 12/2018 | Li | G06F 3/044 |

FOREIGN PATENT DOCUMENTS

| | | | | |
|---|---|---|---|---|
| CN | 114231113 A | | 3/2022 | |
| WO | WO-2010005267 A2 | * | 1/2010 | H01M 8/1048 |
| WO | WO-2014034435 A1 | * | 3/2014 | H01C 7/1006 |

OTHER PUBLICATIONS

WO-2014034435 machine translation (Year: 2014).*

* cited by examiner

*Primary Examiner* — Kyung S Lee
(74) *Attorney, Agent, or Firm* — ScienBiziP, P.C.

(57) ABSTRACT

A pressure-sensitive ink includes an adhesive, conductive particles, and inorganic fillers dispersed in the adhesive. The inorganic fillers include hydrophobic groups, and the inorganic fillers can increase the dispersibility of the conductive particles. The conductive particles can be uniformly dispersed in the adhesive by adding inorganic fillers with hydrophobic groups. The sensitivity and structure stability of a flexible pressure sensing structure are improved, and the noise of the flexible pressure sensing structure is reduced. In addition, the stability and the process yield of the flexible pressure sensing structure are also improved A flexible pressure sensing structure and an electronic device are also disclosed.

17 Claims, 12 Drawing Sheets

PRESSURE-SENSITIVE INK, FLEXIBLE PRESSURE SENSING STRUCTURE, AND ELECTRONIC DEVICE

FIELD

The subject matter relates to printed circuit boards, and more particularly, to a pressure-sensitive ink, a flexible pressure sensing structure, and an electronic device.

BACKGROUND

A flexible pressure sensor has been used in various electronic devices such as robots. The flexible pressure sensor, similar to human skin, can sense the intensity of an external force, thereby allowing the robots to achieve tactile sensation. The flexible pressure sensor is also used in human health monitoring. However, a structure of the current flexible pressure sensor is complex, a thickness of the current flexible pressure sensor is thick, and the current flexible pressure sensor has poor sensitivity and could produce high noise. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
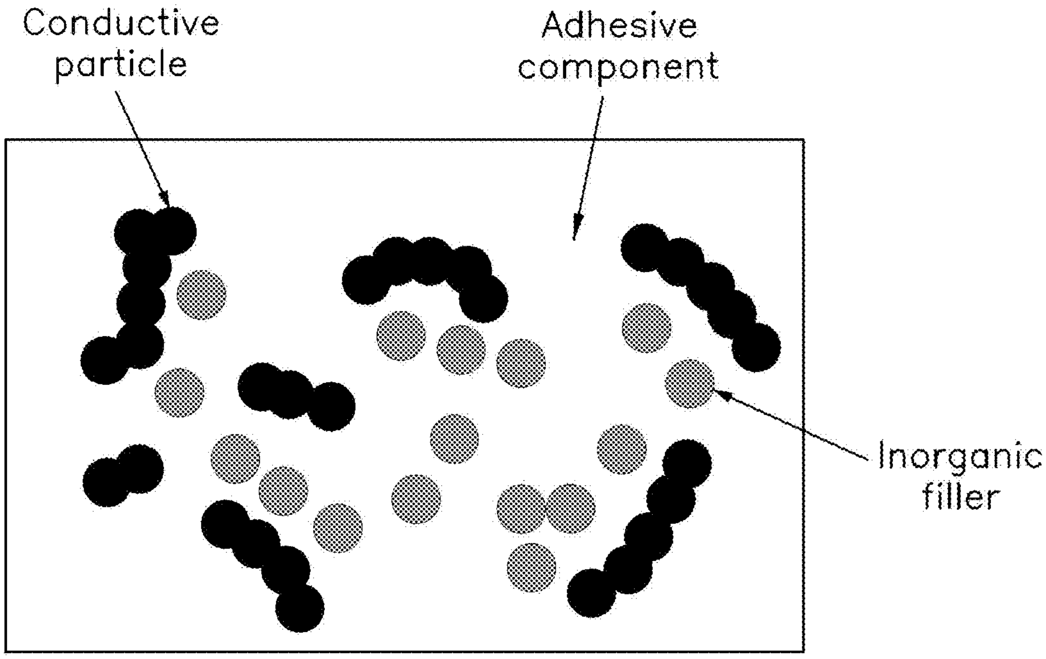
FIG. 1 is a diagrammatic view illustrating inorganic fillers and conductive particles dispersed in an adhesive according to an embodiment of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to;" it specifically indicates open-ended inclusion or membership in the so-described combination, group, series, and the like.

An existing flexible pressure sensor may use pressure capacitance technology, pressure resistance technology, or piezoelectric ceramic technology to achieve pressure sensing. The pressure capacitance technology determines the pressure by sensing a capacitance change caused by a distance change between two metal plates. However, a shape variation of the metal plate may change the capacitance. Therefore, a high machining accuracy of the metal plate is required. The pressure resistance technology determines the pressure by sensing a resistance change caused by a change of contact area between a conductive particle layer and a metal plate. However, it is difficult to obtain a linearity between the change of contact area and the pressure change, and a durability of the flexible pressure sensor is poor. The piezoelectric ceramic technology determines the pressure by sensing a change of conductive particles due to a shape change of the piezoelectric ceramic. However, the piezoelectric ceramic technology can only measure instantaneous pressure. Moreover, the structure of the flexible pressure sensor based on any of the above technologies is complex, the thickness of the flexible pressure sensor is large, and the flexible pressure sensor has poor sensitivity and high noise.

An embodiment of a pressure-sensitive ink is provided, which can form a pressure strain layer (or a pressure strain film, or a pressure strain gauge) after curing. The pressure strain layer can deform when subjected to a pressure, and can be used in a flexible pressure sensing structure.

Referring to FIG. 1, the pressure-sensitive ink comprises an adhesive and conductive particles dispersed in the adhesive.

In an embodiment, the adhesive is a resin which is flexible after curing. The resin is a copolymer of ethylene, acrylic acid, and methacrylic acid. Or the resin is a polymer resin such as polyvinyl alcohol. The adhesive may be a transparent material.

In an embodiment, the conductive particle may be, but is not limited to, carbon black particle, graphite particle, or graphene particle.

Due to the accumulation of charges and high surface energy on a surface of the conductive particle, agglomeration may occur among the conductive particles under van der Waals forces, surface hydrogen bonds, or other chemical bonds. The agglomeration of the conductive particles in the adhesive may affect the conductivity of pressure-sensitive ink, thereby affecting the sensitivity and stability (or noise) of the flexible pressure sensing structure.

Thus, in an embodiment, the pressure-sensitive ink further comprises inorganic fillers dispersed in the adhesive. The inorganic fillers comprise hydrophobic groups, and the inorganic fillers can be used to increase the dispersibility of the conductive particles. That is, the inorganic fillers can be used as a dispersant of the conductive particles, which can improve the dispersibility of the conductive particles. By adding the inorganic filler to the pressure-sensitive ink, the conductive particles can be uniformly dispersed in the adhesive. In an embodiment, each of the hydrophobic groups on the surface of the inorganic fillers includes at least one of fluorine atom, methyl, ethyl, and propyl.

In an embodiment, the inorganic filler is obtained by surface modification of silica with a hydrophobic silane compound, and the hydrophobic silane compound includes the hydrophobic groups. The surface modification allows the silica to have hydrophobic groups on its surface, which reduces surface energy of the silica. At the same time, hydrophobic groups can increase steric hindrance, making it difficult for conductive particles to agglomerate. Therefore, the conductive particles can uniformly disperse in the adhesive. In addition, after the pressure-sensitive ink is heated and solidified to form the pressure strain layer, the adhesive will shrink. The inorganic fillers can have a support function, avoiding structural collapse of the adhesive during shrinking. Thus, the structural stability of the pressure-sensitive ink after curing is improved. Thereby, the noise of the flexible pressure sensing structure is reduced, and the yield is improved. The flexible pressure sensing structure can be applied to related products such as flexible pressure sensors.

In an embodiment, a dielectric constant (Dk) of the inorganic filler is less than or equal to 3. The Dk of the inorganic filler is small. Thus, the inorganic filler can be a dielectric material that may have little influence on the conductivity of pressure-sensitive ink.

Figure 2:
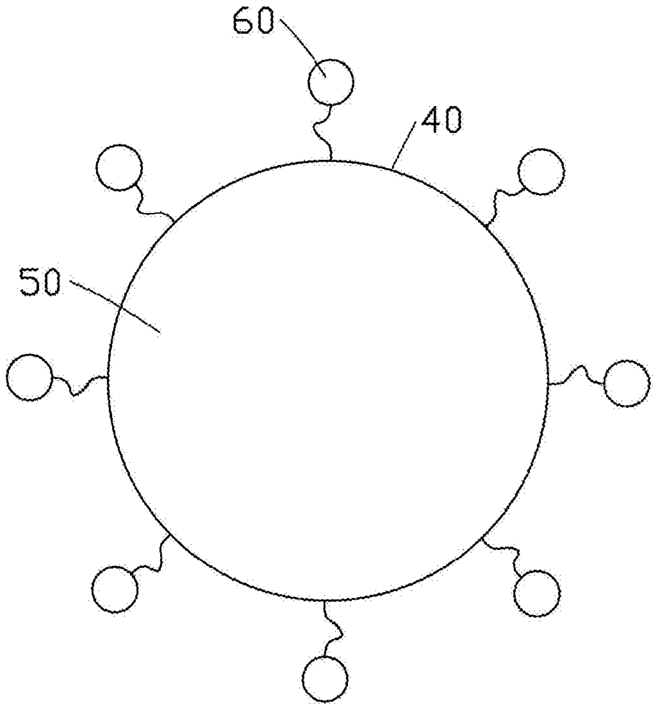
FIG. 2 is a diagrammatic view illustrating an embodiment of the inorganic filler in FIG. 1.
Figure 3:
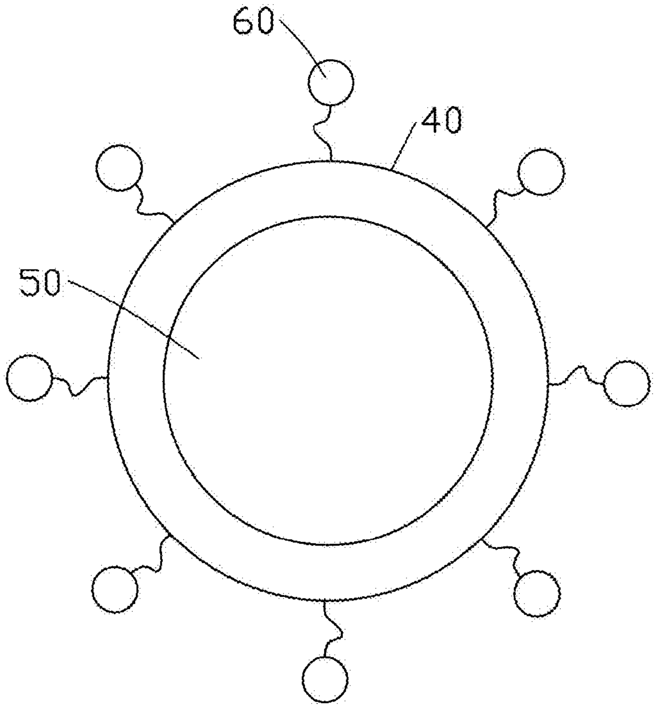
FIG. 3 is a diagrammatic view illustrating another embodiment of the inorganic filler in FIG. 1.
Figure 4:
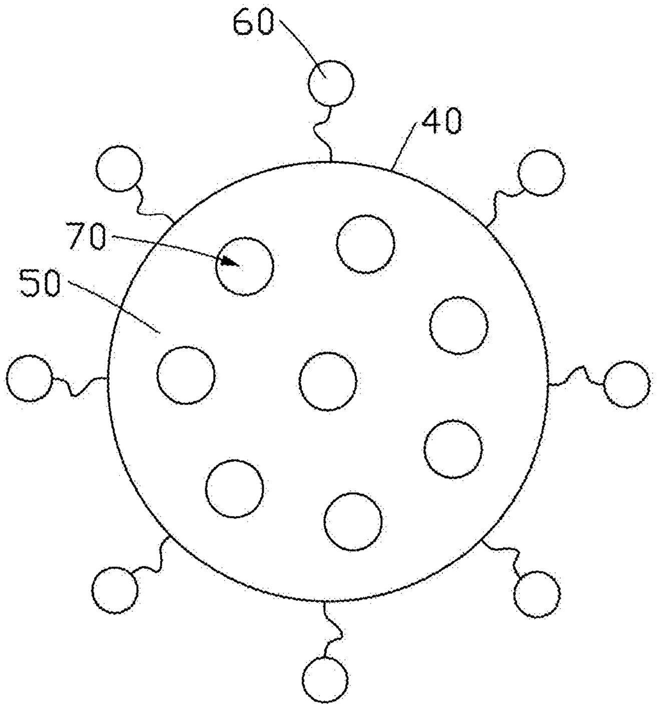
FIG. 4 is a diagrammatic view illustrating yet another embodiment of the inorganic filler in FIG. 1.
Figure 5:
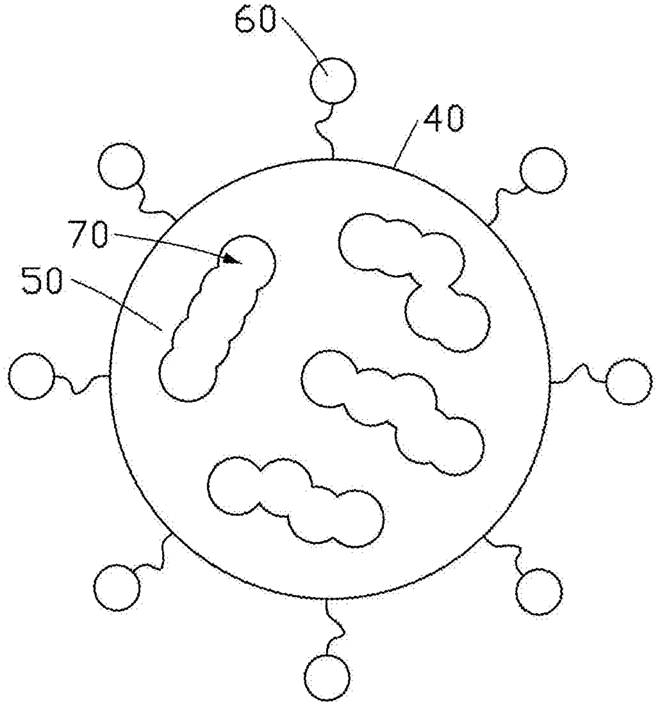
FIG. 5 is a diagrammatic view illustrating another embodiment of the inorganic filler in FIG. 1.

The inorganic filler is granular, and the hydrophobic groups are connected to a surface of the inorganic filler particle. Referring to FIGS. 2 to 5, the inorganic filler includes a core 50 and a shell 40 on the core 50. The hydrophobic groups 60 are connected to a surface of the shell 40. As shown in FIG. 2, in an embodiment, the core 50 is solid, thereby the inorganic filler is solid. As shown in FIG. 3, in another embodiment, the core 50 has a big hollow structure, thereby the inorganic filler is hollow. As shown in FIGS. 4 and 5, in yet another embodiment, the inner layer 50 has a plurality of hollow structures, and the hollow structure is microporous structure 70. The microporous structure 70 may have different shapes as shown in FIGS. 4 and 5.

The inorganic filler has at least one hollow structure. Air can be introduced into the hollow structure of the inorganic filler, thereby further reducing the Dk of the inorganic filler. The Dk of the inorganic filler has a hollow or microporous structure is less than or equal to 2.5. Thereby the influence of the inorganic filler on the conductivity of pressure-sensitive ink is further reduced, and the stability of the conductivity of the pressure-sensitive ink is further improved. A pore size of the microporous structure in the inorganic filler may be controlled, thereby adjusting a density of the inorganic filler. In addition, the microporous structure is formed in the core 50 of the inorganic filler, which can prevent the adhesives from flowing into the microporous structure of the inorganic filler. The microporous structure may have a smaller size, which can prevent the adhesive from flowing into the microporous structure of the inorganic filler if the inorganic filler is damaged.

In an embodiment, the big hollow structure or the microporous structures can be achieved by adding a pore forming template (or pore forming agent) to raw material of the inorganic filler, preparing spherical inorganic filler particle by the sol-gel method, and then removing the pore forming template in the particles to obtain the inorganic filler with microporous structure. The removal method of the pore forming template is selected according to the type of the pore forming template, for example, the pore forming template can be removed by sintering or dissolving.

In an embodiment, an average particle size of the inorganic filler ranges from 10 nm to 100 nm. Optionally, the average particle size of the inorganic filler ranges from 10 nm to 80 nm. Optionally, the average particle size of the inorganic filler ranges from 20 nm to 50 nm. As an example, the average particle size of the inorganic filler is 10 nm, 20 nm, 30 nm, 40 nm, 50 nm, 60 nm, 70 nm, 80 nm, 90 nm, or 100 nm. By controlling the average particle size of the inorganic fillers within the above range, the conductive particles may have good dispersibility in the adhesive, while also improving the conductivity of the pressure-sensitive ink.

In an embodiment, the pressure-sensitive ink includes 5-10 wt % inorganic fillers, 15-25 wt % conductive particles, and 15-25 wt % adhesive. In an embodiment, the pressure-sensitive ink also includes 0-5 wt % auxiliary agent and 50-60 wt % solvents. The weight percentage of the inorganic fillers in the pressure-sensitive ink can range from 5 wt % to 10 wt %, and for example, the weight percentage of the inorganic fillers may be 5 wt %, 6 wt %, 7 wt %, 8 wt %, 9 wt %, or 10 wt %. The inorganic fillers are evenly stirred and dispersed in the adhesive through three rollers. By controlling the weight percentage of the inorganic fillers within the above range, the conductive particles can have good dispersibility in the adhesive, while also improving the conductivity of the pressure-sensitive ink.

In an embodiment, the auxiliary agent can be at least one of leveling agent, defoamer, and photoinitiator.

In an embodiment, the solvent can be at least one of ethylene glycol butyl ether, and aromatic solvents.

With the above configuration, the conductive particles can be uniformly dispersed in the adhesive by adding inorganic fillers with hydrophobic groups on the surface. The sensitivity and structure stability of the flexible pressure sensing structure are improved, and the noise of the flexible pressure sensing structure is reduced. In addition, the inorganic fillers can have support function, avoiding structural collapse of the pressure-sensitive ink during thermal curing shrinkage, which may improve the stability and the process yield of the flexible pressure sensing structure.

Figure 6:
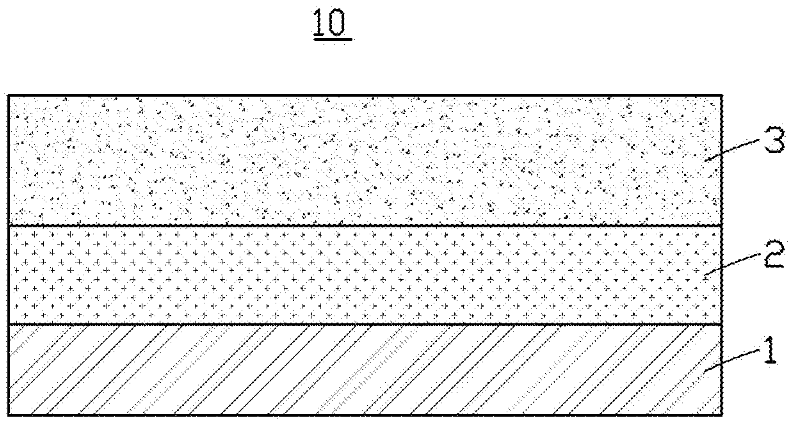
FIG. 6 is a diagrammatic view illustrating a flexible pressure sensing structure according to an embodiment of the present disclosure.

Referring to FIG. 6, an embodiment of the flexible pressure sensing structure 10 is provided, which includes an insulating layer 1, a pressure strain layer 2, and a conductive layer 3 stacked in that order. The pressure strain layer 2 includes a matrix, conductive particles dispersed in the matrix, and inorganic fillers dispersed in the matrix. The pressure strain layer 2 is obtained by curing the pressure-sensitive ink mentioned above. The matrix is obtained by curing the adhesive. A curing method is selected based on the type of the adhesive in the pressure-sensitive ink. For example, a thermal curing method can be used. The insulating layer 1 can serve as an insulation support. A material of the conductive layer 3 can be a metal with excellent conductivity, such as silver. The conductive layer 3 covers and electrically connects to the pressure strain layer 2. The conductive layer 3 may further electrically connected to an external component. The conductive layer 3 with excellent conductivity can improve the sensitivity of the flexible pressure sensing structure 10.

In an embodiment, the flexible pressure sensing structure 10 can be a strain type pressure sensor.

The pressure strain layer 2 is obtained by curing the pressure-sensitive ink mentioned above. The conductive particles can be uniformly dispersed in the adhesive by adding inorganic fillers with hydrophobic groups on the surfaces. Thus, a resistance changing rate of the flexible pressure sensing structure 10 is reduced, and the sensitivity of the flexible pressure sensing structure 10 is improved. In addition, the structure stability of the flexible pressure sensing structure 10 is improved, and the noise of the flexible pressure sensing structure 10 is reduced. The inorganic filler can also have a supporting function in the pressure-sensitive ink to reduce the structural collapse of the pressure strain layer 2, which may improve the stability and the process yield of the flexible pressure sensing structure 10. In an embodiment, a change rate of resistance of the flexible pressure sensing structure 10 is less than or equal to 20%. The noise of the flexible pressure sensing structure 10 is 1.2±0.5.

Figure 7:
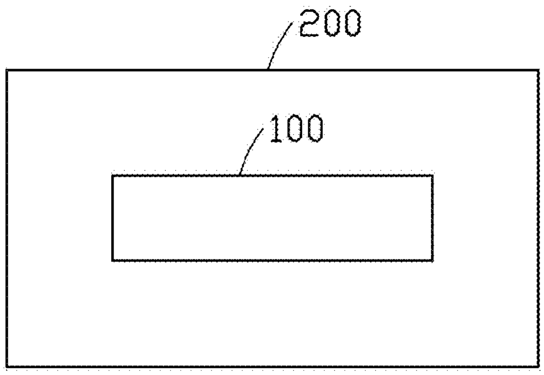
FIG. 7 is a diagrammatic view illustrating an electronic device according to an embodiment of the present disclosure.
Figure 8:
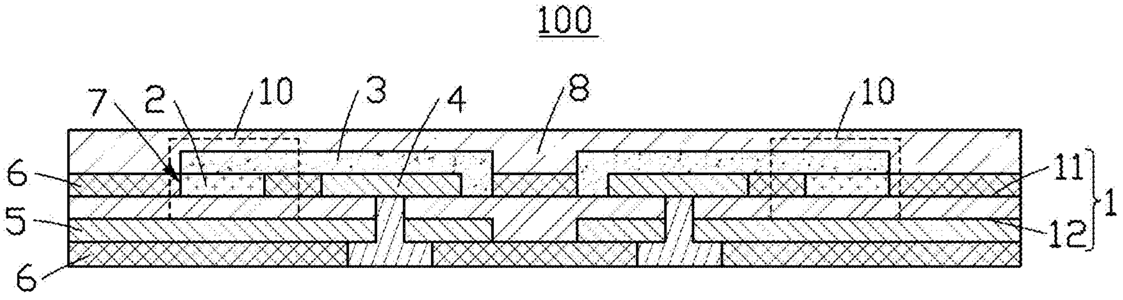
FIG. 8 is a diagrammatic view illustrating a circuit board according to an embodiment of the present disclosure.

Referring to FIGS. 7 and 8, an embodiment of an electronic device 200 is provided, which includes a circuit board 100. The circuit board 100 includes multiple flexible pressure sensing structures 10 mentioned above. The conductive layer 3 is electrically connected to a circuit layer 4 (shown in FIG. 8) of the circuit board 100. In an embodiment, the flexible pressure sensing structure 10 can be formed inside the circuit board 100.

In an embodiment, the circuit board 100 includes the insulating layer 1, the pressure strain layer 2, the circuit layer 4 located on a first surface 11 of the insulating layer 1, another circuit layer 5 located on a second surface 12 of the insulating layer 1, and the conductive layer 3 located on each of the pressure strain layer 2 and the circuit layer 4. The pressure strain layer 2 is electrically connected to the circuit layer 4 through the conductive layer 3, and the circuit layer 4 is electrically connected to the circuit layer 5, thereby achieving the electrical extraction of the pressure strain layer 2. The stacked insulating layer 1, the pressure strain layer 2, and the conductive layer 3 constitute the flexible pressure sensing structure 10. In an embodiment, the circuit board 100 may also include a covering film 6 covering on the insulating layer 1, the conductive layer 3, and the circuit layer 5 for protection. In another embodiment, there may be multiple flexible pressure sensing structures 10 in the circuit board 100. In a third embodiment, one or more additional layers can be added on the surfaces of the circuit layers 4 and 5, respectively.

Figure 9:
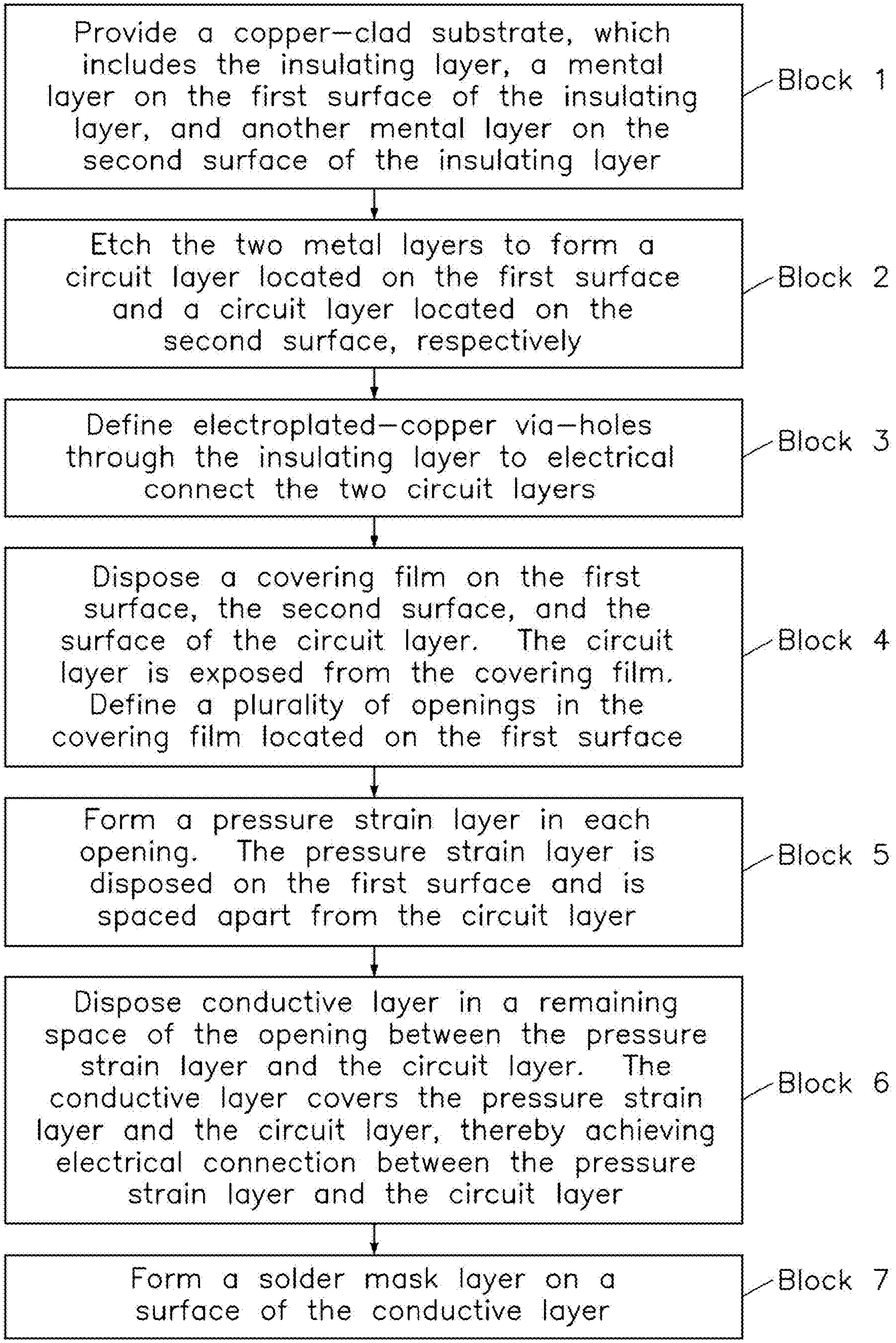
FIG. 9 is a flowchart illustrating a manufacturing method of a circuit board according to an embodiment of the present disclosure.

FIG. 9 illustrates a flowchart of a manufacturing method of a circuit board 100 in accordance with an embodiment. The method is provided by way of embodiments, as there are a variety of ways to carry out the method. Each block shown in FIG. 9 represents one or more processes, methods, or subroutines carried out in the method. Furthermore, the illustrated order of blocks can be changed. Additional blocks may be added or fewer blocks may be utilized, without departing from this disclosure. The method can begin at block 1.

Figure 10:
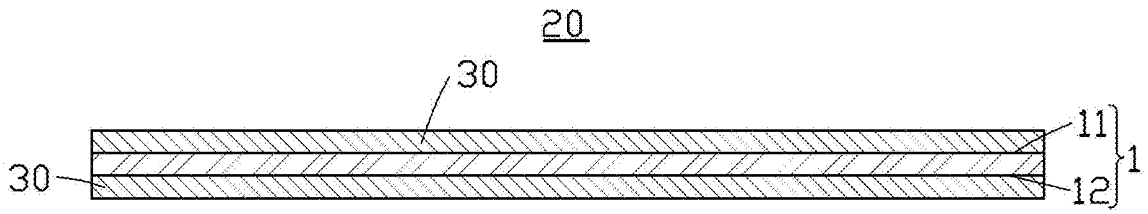
FIGS. 10 to 17 are diagrammatic views illustrating preparation processes of a circuit board according to an embodiment of the present disclosure.

Block 1, referring to FIG. 10, a copper-clad substrate 10 is provided, which includes the insulating layer 1, a metal layer 30 on the first surface 11 of the insulating layer 1, and another metal layer 30 on the second surface 11 of the insulating layer 1.

Figure 11:
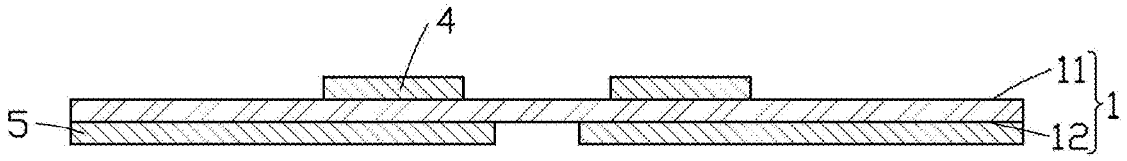

Block 2, referring to FIG. 11, the two metal layers 30 are etched to form a circuit layer 4 located on the first surface 11 and a circuit layer 5 located on the second surface 12, respectively.

Figure 12:
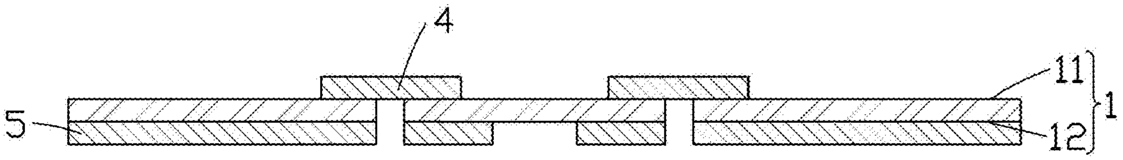
Figure 13:
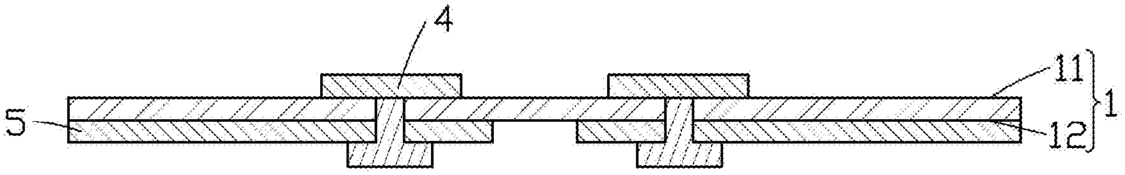

Block 3, referring to FIGS. 12 and 13, electroplated-copper via-holes are defined in the insulating layer 1 to electrical connect the two circuit layers 4 and 5 to each other.

Figure 14:
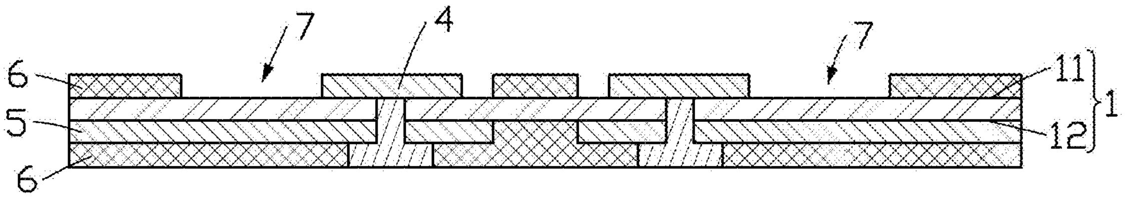

Block 4, referring to FIG. 14, a covering film 6 (CVL) is disposed on the first surface 11, the second surface 12, and the surface of the circuit layer 5. The circuit layer 4 is exposed from the covering film 6. A plurality of openings 7 are defined in the covering film 6 located on the first surface 11.

In an embodiment, a size and a shape of the opening 7 can be set according to actual needs. Referring to FIG. 14, the opening 7 is defined around the circuit layer 4, and the covering film 6 around the circuit layer 4 is also removed, which can increase a contact area between the conductive layer, the pressure strain layer, and the circuit layer 4 formed subsequent, and can improve the sensitivity. The covering film 6 between the opening 7 and the circuit layer 4 can also be retained to avoid damage to the circuit layer 4 during the etching of the covering film 6.

Figure 15:
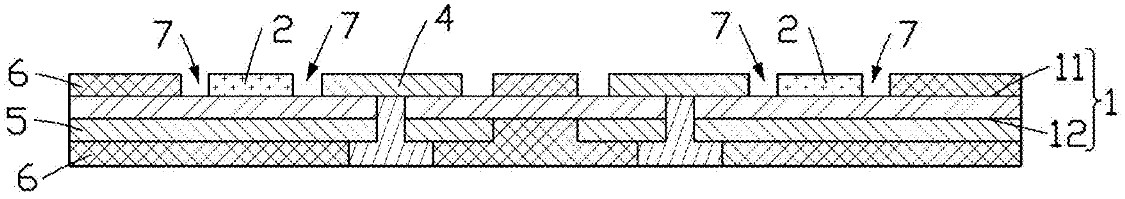

Block 5, referring to FIG. 15, a pressure strain layer 2 is formed in each opening 7. The pressure strain layer 2 is disposed on the first surface 11 and is spaced apart from the circuit layer 4.

The pressure-sensitive ink can be formed in the openings 7 through printing, coating, or other methods. And then the pressure-sensitive ink in the openings 7 is heated and cured to form the pressure strain layer 2. A thickness of the pressure-sensitive ink can be thin, which can reduce the thickness of the flexible pressure sensing structure.

Figure 16:
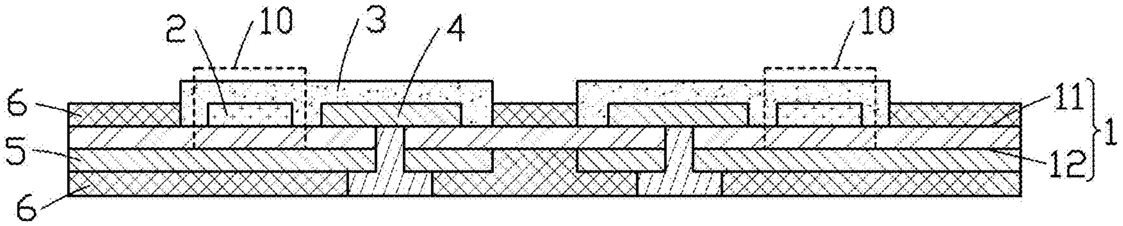

Block 6, referring to FIG. 16, the conductive layer 3 is formed in a remaining space of the opening 7 between the pressure strain layer 2 and the circuit layer 4. The conductive layer 3 covers the pressure strain layer 2 and the circuit layer 4, thereby achieving electrical connection between the pressure strain layer 2 and the circuit layer 4.

The conductive layer 3 can be formed by conductive silver paste. By filling the gaps between the pressure strain layer 2 and circuit layer 4 with the conductive silver paste, the conductive silver paste can fully contact with the pressure strain layer 2 and the circuit layer 4, which can improve the sensitivity of the flexible pressure sensing structure.

Figure 17:
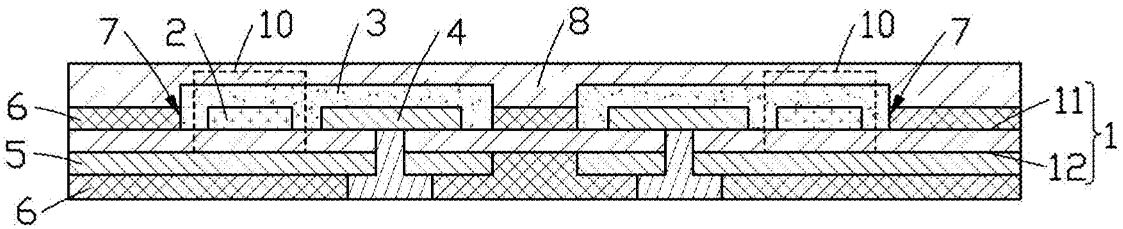

Block 7, referring to FIG. 17, a solder mask layer 8 is formed on a surface of the conductive layer 3. The solder mask layer 8 can also extend to a surface of the covering film 6 located on the same side.

Synthetic Examples 1-4

Step 1, tetraethoxysilane (TEOS) and hydrophobic silane compound (methyl/ethyl/propyltrimethoxysilane or trimethoxy (3,3,3-trifluoropropyl) silane) were added simultaneously to an aqueous solution. A molar concentration of TEOS ranged from 0.07 mol/L to 0.09 mol/L. A molar concentration of the hydrophobic silane compound in aqueous solution ranged from 0.02 mol/L to 0.05 mol/L.

Step 2, excepting for the solid inorganic fillers that do not require the addition of a pore forming agent, a pore forming template (or pore forming agent) was added inside the inorganic fillers to form pores or micropore. The pore forming template might be Planic F127 (PEO 100-(PPO) 65-(PEO) 100 triblock copolymer, poly (ethylene oxide) poly (propylene oxide) poly (ethylene oxide), Pluronic® F127; a dosage of the Planic F127 ranges from 0.5 mol/L to 0.8 mol/L), Sodium dodecyl sulfate (SDS) (0.5~0.8 mol/L), or D-maltose (dosage: 0.8~1.2 mol/L).

Step 3, ammonia ($NH_4OH$) as a catalyst was added in the above solution. A molar concentration of the ammonia ranged from 0.2 mol/L to 0.5 mol/L. And then an intermediate product was obtained through sol-gel reaction of the siloxane.

Step 4, the pore forming template was removed from the intermediate product. The pore forming template such as Pluronic® F127 or SDS was removed by low-temperature calcination (250° C.). The pore forming template such as D-maltose was removed by washing in the water to dissolve the pore forming template.

Step 5, the intermediate product was cleaned and dried after removing the pore forming template with deionized water to obtain the inorganic filler after surface modification.

The parameters of the preparation processes and test results of dielectric constants of four different types of inorganic fillers for Synthetic Examples 1-4 are shown in Table 1. The internal structures of the inorganic fillers of Synthetic Examples 1 to 4 are shown in FIGS. 2 to 5, respectively.

TABLE 1

| | Synthetic Example 1 | Synthetic Example 2 | Synthetic Example 3 | Synthetic Example 4 |
|---|---|---|---|---|
| Microporous structure | solid | hollowed | mesoporous | wormhole |
| TEOS (mol/L) | 0.07~0.09 | | | |
| Hydrophobic silane compound (mol/L) | 0.07~0.09 | | | |
| Catalyst (mol/L) | $NH_4OH$ (0.02~0.05 mol/L) | | | |
| Pore forming template | No | Pluronic ® F127 (0.5~0.8 mol/L) | SDS (0.5~0.8 mol/L) | D-maltose (0.8~1.2 mol/L) |
| Removing method of the pore forming template. | NO | Low-temperature calcination (250° C.) | Low-temperature calcination (250° C.) | Washing 3 times in the water. |
| Pore size of the micropore (nm) | NO | 70~100 | 10~30 | 10~30 |
| Dk (Dielectric Constant) | 2.8~3 | 2.2~2.5 | 2.2~2.5 | 2.2~2.5 |

Examples 1-3

The adhesive, the conductive particles, the inorganic filler prepared in Synthetic Example 3, other additive agents, and solvent were mixed to obtain the pressure-sensitive ink. The amount of the inorganic filler was different in Examples 1 to 3. The conductive particles used in Examples 1 to 3 were carbon black particles.

The formulas of the pressure-sensitive inks in Examples 1 to 3 are shown in Table 2. The parameters for performance characterization after preparing the pressure-sensitive inks in Examples 1 to 3 into flexible pressure sensing structures are also shown in Table 2.

TABLE 2

| Component | Formulas | Example 1 | Example 2 | Example 3 |
|---|---|---|---|---|
| Inorganic filler (wt %) | 5~10 | 5 | 7.5 | 10 |
| Conductive particle (wt %) | 17~22 | 18 | 18 | 18 |
| Adhesive (wt %) | 15~25 | 25 | 25 | 25 |
| Leveling agent (wt %) | <0.5 | 0.5 | 0.5 | 0.5 |
| Defoaming agent (wt %) | <0.5 | 0.5 | 0.5 | 0.5 |
| Photoinitiator (wt %) | <4 | 4.0 | 4.0 | 4.0 |
| Ethylene glycol butyl ether solvent (wt %) | 35~40 | 27 | 27 | 27 |
| Aromatic solvent (wt %) | 15~20 | 20 | 17.5 | 15 |
| Appearance of the pressure strain layer | — | Slight serration | Good printability and square appearance. | Good printability and square appearance. |
| Resistance change rate | ≤20% | 20% | 15% | 14% |
| Noise | ≤1.2 ± 0.5 | 1.2 ± 0.5 | 1.2 ± 0.3 | 1.2 ± 0.4 |

Figure 18:
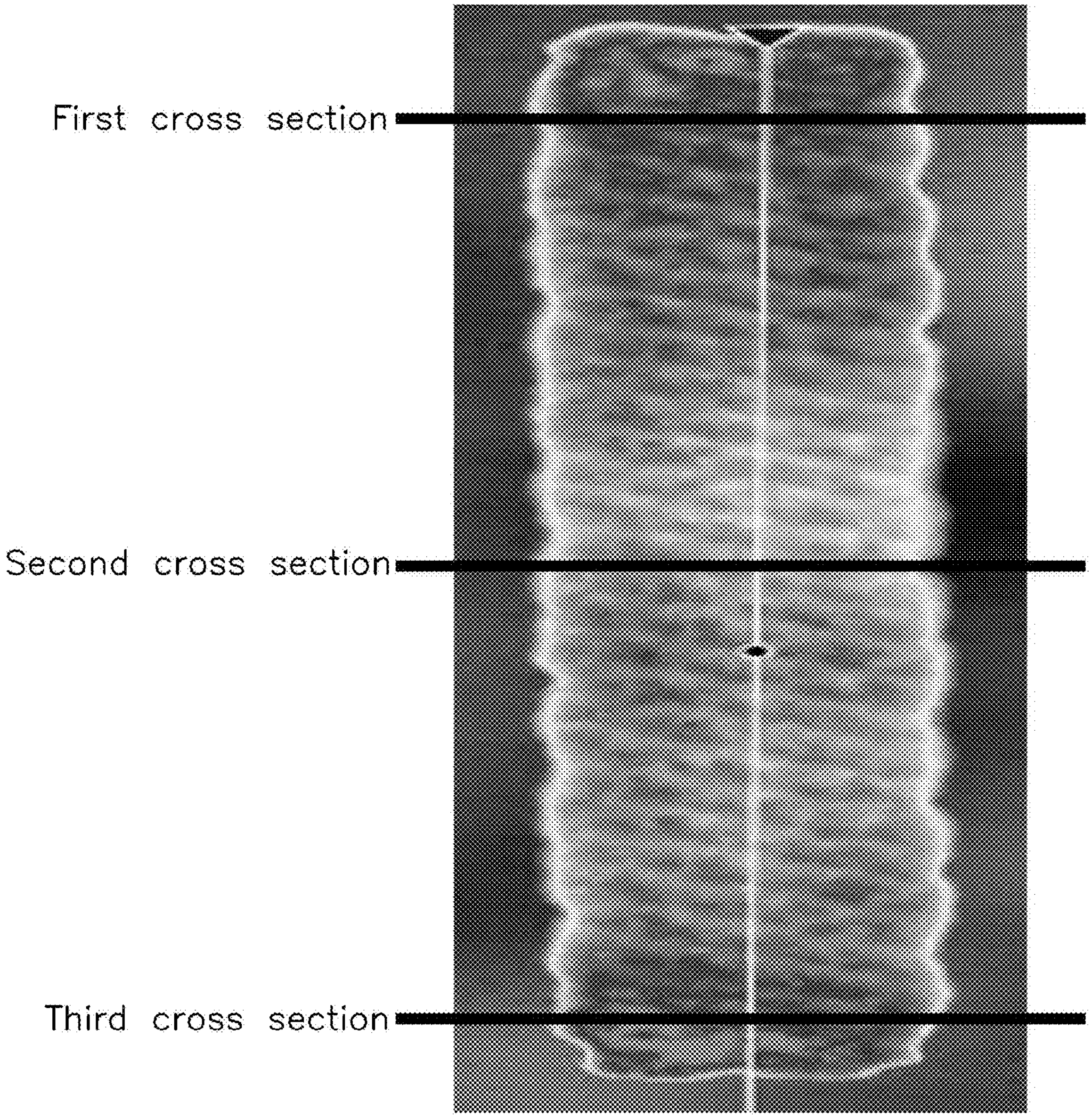
FIG. 18 is a photo illustrating a pressure strain region of a flexible pressure sensing structure prepared by a pressure-sensitive ink in Example 1 of the present application.
Figure 19A:
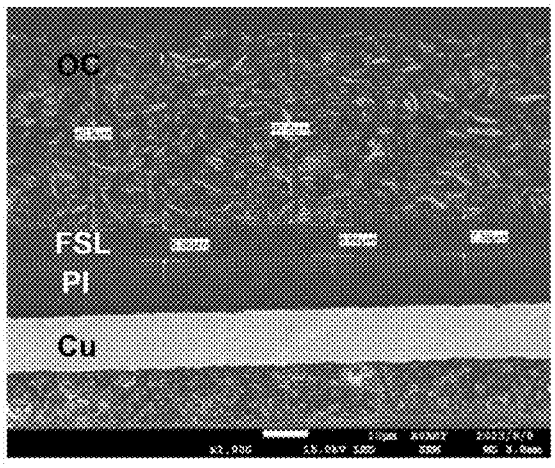
FIG. 19A is a scanning electron microscope (SEM) photo illustrating a first cross section of the pressure strain region in FIG. 18.
Figure 19B:
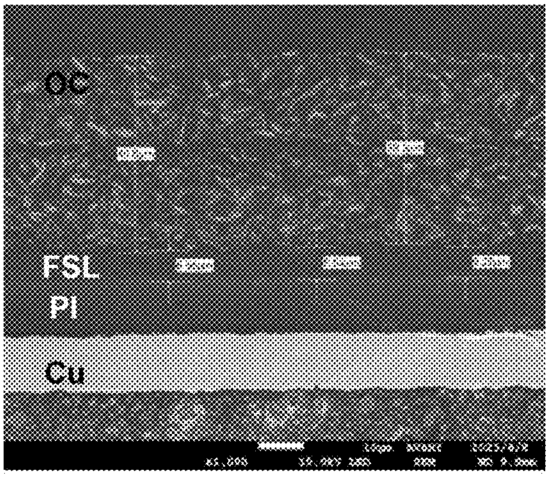
FIG. 19B is an SEM photo illustrating a second cross section of the pressure strain region in FIG. 18.
Figure 19C:
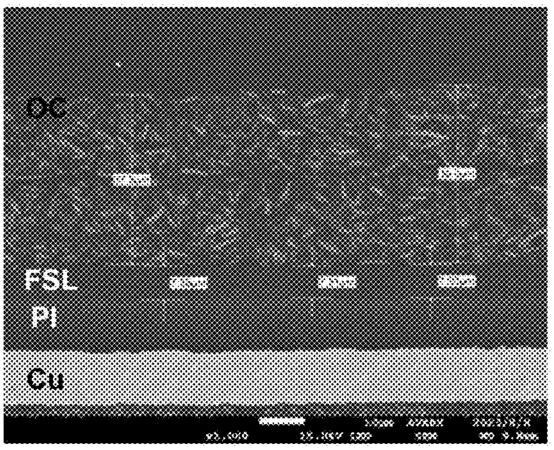
FIG. 19C is an SEM photo illustrating a third cross section of the pressure strain region in FIG. 18.

Referring to FIG. 18, a photo illustrating a pressure strain region of a flexible pressure sensing structure prepared using the pressure-sensitive ink of Example 1 is provided. FIGS. 19A to 19C are scanning electron microscope (SEM) photos of a first cross section, a second cross section, and a third cross section of the pressure strain region in FIG. 18. Wherein, a FSL region is an area where the pressure strain layer is located. As shown in FIGS. 19A to 19C, it can be seen that the first cross section, the second cross section, and the third cross section of the pressure strain layer in the circuit board present a smooth and uniform appearance structure, without obvious particles or uneven depressions. Therefore, adding the inorganic filler in the pressure-sensitive ink can make the conductive particles evenly disperse in the adhesive composition. Moreover, the addition of inorganic filler can occupy the space of the adhesive composition with the conductive particles, support the colloidal structure to prevent shrinkage after heating, and reduce the risk of depression and unevenness of the pressure strain layer.

In summary, the conductive particles can be uniformly dispersed in the adhesive by adding inorganic filler with hydrophobic groups on the surface. The resistance change rate of the flexible pressure sensing structure is effectively reduced (the resistance change rate≤20%), the sensitivity of the flexible pressure sensing structure is improved, and the stability of the flexible pressure sensing structure is also improved. The noise of the flexible pressure sensing structure is reduced (the noise≤1.2±0.5). In addition, the inorganic filler in the pressure-sensitive ink can improve the structural stability and levelling of the pressure strain layer, and reduce the structural collapse of the pressure-sensitive ink during thermal curing shrinkage. Therefore, the process yield of the flexible pressure sensing structure is also improved.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A pressure-sensitive ink, comprising:
an adhesive;
conductive particles dispersed in the adhesive; and
inorganic fillers dispersed in the adhesive, wherein the inorganic fillers comprise hydrophobic groups, each of the inorganic fillers further comprises a core and a shell on the core, the hydrophobic groups are connected to a surface of the shell, and the core defines at least one hollow structure.

2. The pressure-sensitive ink of claim 1, wherein the core defines a plurality of hollow structures, each of the plurality of hollow structures is a microporous structure.

3. The pressure-sensitive ink of claim 1, wherein a dielectric constant of each of the inorganic fillers is less than or equal to 3.

4. The pressure-sensitive ink of claim 1, wherein an average particle size of each of the inorganic fillers ranges from 10 nm to 100 nm.

5. The pressure-sensitive ink of claim 1, wherein each of the hydrophobic groups comprises at least one of fluorine atom, methyl, ethyl, and propyl.

6. The pressure-sensitive ink of claim 1, wherein a weight percentage of the inorganic fillers in the pressure-sensitive ink ranges from 5 wt. % to 10 wt. %.

7. A flexible pressure sensing structure, comprising:
an insulating layer, a pressure strain layer, and a conductive layer stacked in a sequential order, wherein the pressure strain layer comprises:
a matrix;
conductive particles dispersed in the matrix; and
inorganic fillers dispersed in the matrix, wherein the inorganic fillers comprise hydrophobic groups, each of the inorganic fillers further comprises a core and a shell on the core, the hydrophobic groups are connected to a surface of the shell, and the core defines at least one hollow structure.

8. The flexible pressure sensing structure of claim 7, wherein the core defines a plurality of hollow structures, each of the plurality of hollow structures is a microporous structure.

9. The flexible pressure sensing structure of claim 7, wherein a dielectric constant of each of the inorganic fillers is less than or equal to 3.

10. The flexible pressure sensing structure of claim 7, wherein an average particle size of each of the inorganic fillers ranges from 10 nm to 100 nm.

11. The flexible pressure sensing structure of claim 7, wherein each of the hydrophobic groups comprises at least one of fluorine atom, methyl, ethyl, and propyl.

12. The flexible pressure sensing structure of claim 7, wherein a weight percentage of the inorganic fillers in the pressure strain layer ranges from 5 wt. % to 10 wt. %.

13. The flexible pressure sensing structure of claim 7, wherein the flexible pressure sensing structure is a strain type pressure sensor.

14. The flexible pressure sensing structure of claim 7, wherein a change rate of resistance of the flexible pressure sensing structure is less than or equal to 20%, and a noise of the flexible pressure sensing structure is 1.2±0.5.

15. An electronic device, comprising:
a circuit board comprising at least one flexible pressure sensing structure, each of the at least one flexible pressure sensing structure comprising:
an insulating layer, a pressure strain layer, and a conductive layer stacked in a sequential order, wherein the pressure sensing layer is electrically connected to a circuit layer of the circuit board through the conductive layer, the pressure strain layer comprising:
a matrix;
conductive particles dispersed in the matrix; and
inorganic fillers dispersed in the matrix, wherein the inorganic fillers comprise hydrophobic groups, each of the inorganic fillers further comprises a core and a shell on the core, the hydrophobic groups are connected to a surface of the shell, and the core defines at least one hollow structure.

16. The electronic device of claim 15, wherein a dielectric constant of each of the inorganic fillers is less than or equal to 3.

17. The electronic device of claim 15, wherein a weight percentage of the inorganic fillers in the pressure strain layer ranges from 5 wt. % to 10 wt. %.

* * * * *